No. 644,306. Patented Feb. 27, 1900.
H. TENHAM.
LUBRICATOR FOR WINDMILLS.
(Application filed Apr. 28, 1899.)
(No Model.) 2 Sheets—Sheet 1.
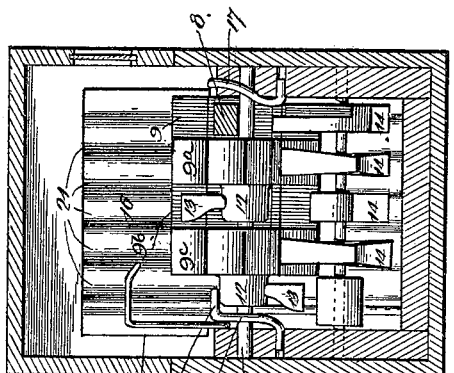
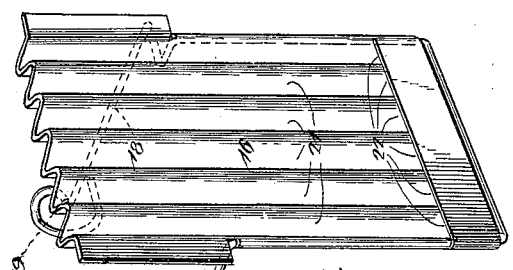
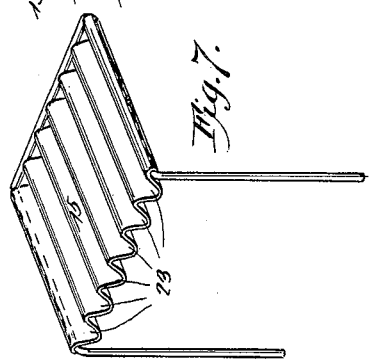
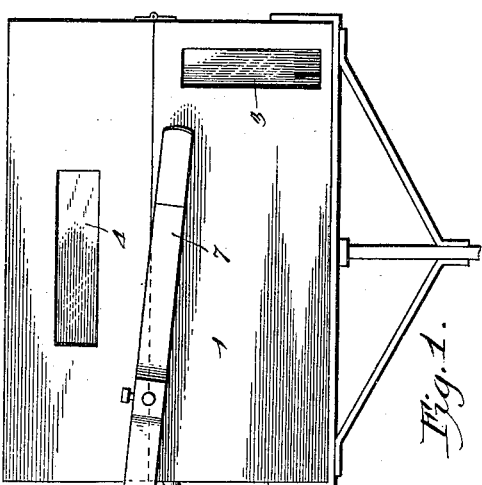
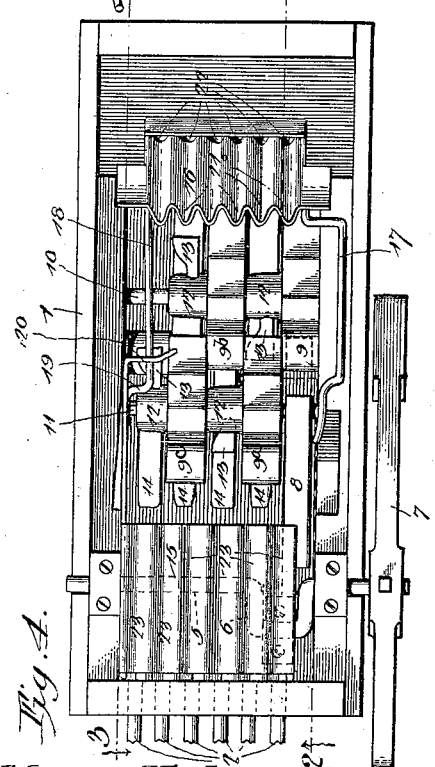
Witnesses
Herman Tenham, Inventor.
By his Attorneys.

No. 644,306. Patented Feb. 27, 1900.
H. TENHAM.
LUBRICATOR FOR WINDMILLS.
(Application filed Apr. 28, 1899.)
(No Model.) 2 Sheets—Sheet 2.

Witnesses
J. Frank Culverwell.
J. J. Riley

Herman Tenham, Inventor.
By his Attorneys,
C. A. Snow & Co.

UNITED STATES PATENT OFFICE.

HERMAN TENHAM, OF BRANDON, WISCONSIN.

LUBRICATOR FOR WINDMILLS.

SPECIFICATION forming part of Letters Patent No. 644,306, dated February 27, 1900.

Application filed April 28, 1899. Serial No. 714,840. (No model.)

*To all whom it may concern:*

Be it known that I, HERMAN TENHAM, a citizen of the United States, residing at Brandon, in the county of Fond du Lac and State of Wisconsin, have invented a new and useful Lubricator for Windmills, of which the following is a specification.

The invention relates to improvements in lubricators for windmills.

The object of the present invention is to improve the construction of lubricators and to provide a simple and comparatively-inexpensive one designed for use in connection with windmills and various other machinery and capable of automatically supplying the bearings with oil after such a machine has operated a predetermined extent, so that the bearings will always be in proper condition and will not become heated.

The invention consists in the construction and novel combination and arrangement of parts hereinafter fully described, illustrated in the accompanying drawings, and pointed out in the claims hereto appended.

Figure 2:
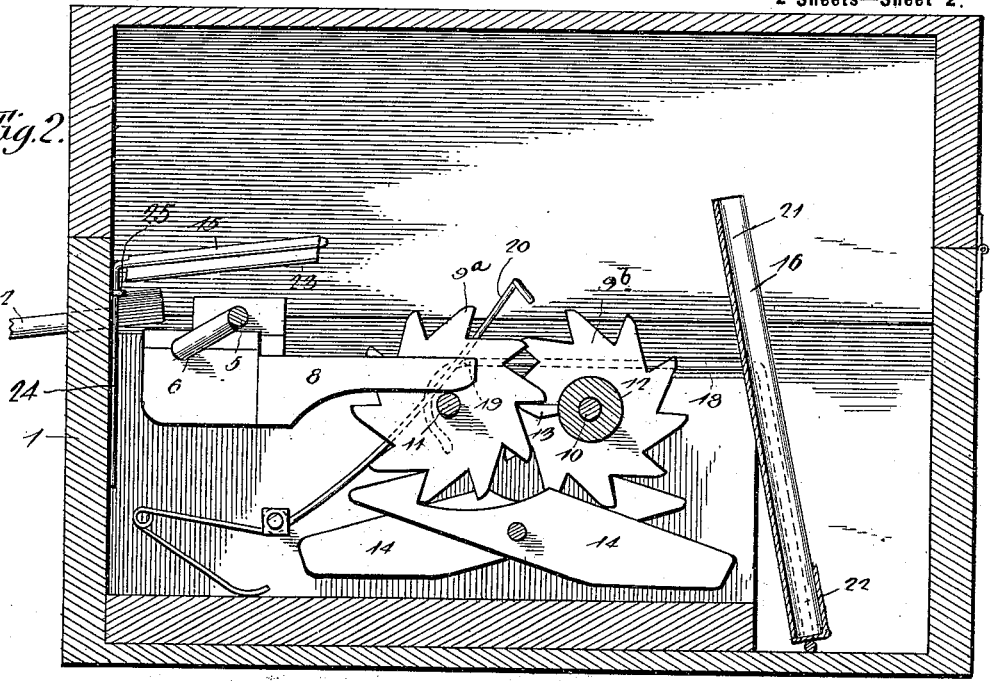
Figure 3:
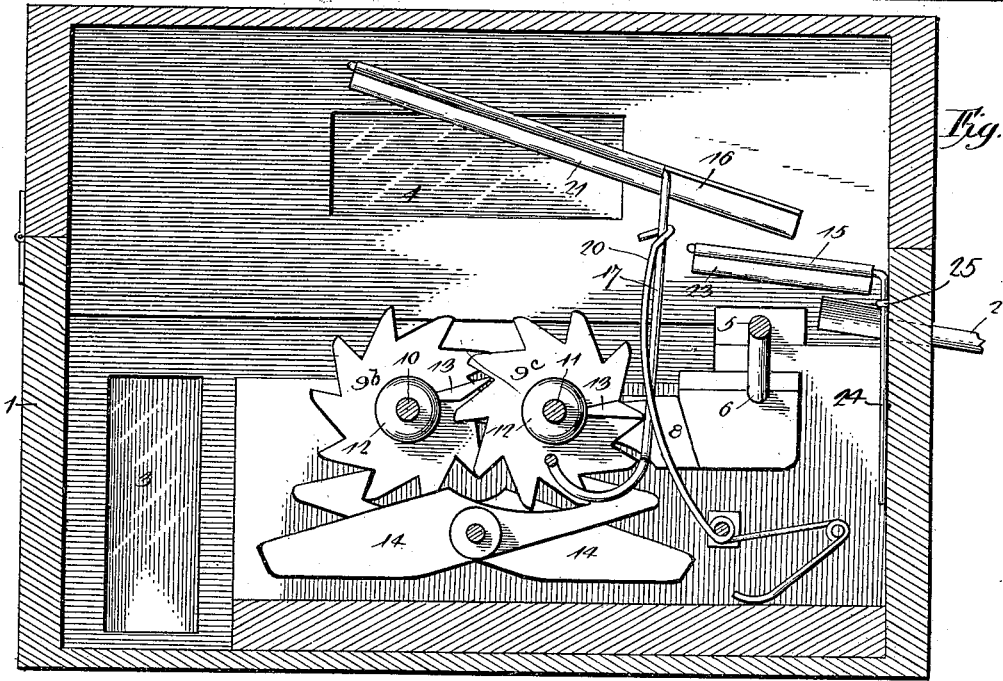

In the drawings, Figure 1 is an elevation of a lubricator constructed in accordance with this invention. Fig. 2 is a longitudinal sectional view of the same, illustrating the normal position of the oscillating lubricant carrier or feeder, the section being taken on line 2 2 of Fig. 4. Fig. 3 is a similar view showing the same in its discharging position, the section being taken on line 3 3 of Fig. 4. Fig. 4 is a horizontal sectional view, the actuating-pawl being shown in full lines out of engagement with the first wheel of the series and in engagement with the same in dotted lines. Fig. 5 is a transverse sectional view. Fig. 6 is a detail perspective view of the oscillating carrier or feeder. Fig. 7 is a similar view of the distributing device.

Like numerals of reference designate corresponding parts in all the figures of the drawings.

1 designates a casing constructed of any suitable material, designed to be supported above the bearings of a windmill or other machine and adapted to contain a lubricant and to be connected with the said bearings by a series of feeding-tubes 2, preferably elastic to permit them to yield to the movement of the working parts of a windmill or other machine. The casing is provided at one side with transparent plates 3 and 4, disposed vertically and horizontally and adapted to enable the operator to ascertain the amount of oil within the lubricator and to see if the device is working properly.

Within the casing is arranged a rock-shaft 5, provided between its ends with a crank-bend 6 and having one end extended beyond the casing and carrying a weighted lever 7, which is adapted to be connected with the pump-rod of a windmill or a working part of another machine, and it will be apparent that as the pump-rod is reciprocated the rock-shaft will be partially rotated to oscillate the crank-bend and reciprocate an actuating pawl or dog 8. This lever is weighted at its longer end for the purpose of enabling it to more perfectly follow the movement of the pump-rod or other moving bar to which it is attached. The weighted end of the lever causes it to make its full stroke and to operate more positively upon the shaft 5, to which it is connected, than it would otherwise do if this end were not weighted. The pawl or dog 8, which extends longitudinally of the casing, as clearly illustrated in Fig. 2 of the accompanying drawings, is arranged to engage and operate the first wheel 9 of a train of ratchet-wheels 9, $9^a$, $9^b$, and $9^c$, which are arranged, as illustrated in Fig. 4 of the accompanying drawings, on counter-shafts 10 and 11. The first wheel 9 of the series lies in the path of the pawl or dog 8, which is reciprocated by the operation of the rock-shaft, and at each inward movement the said pawl or dog is adapted to rotate the first wheel 9 the distance of one tooth. Each ratchet-wheel is provided at one side with a laterally-projecting hub 12, upon which is mounted a tooth or projection 13, adapted, when its wheel has made a complete revolution, to engage the adjacent wheel and advance the same the distance of one tooth, and after it has made a complete revolution its tooth or projection 13 engages the second wheel $9^a$ of the train and moves that the distance of one tooth. This operation continues until the third wheel $9^b$ and the last wheel $9^c$ of the series have made a revolution, and it will be apparent that by varying the number of wheels in the train or series and the number of their teeth the device may be constructed so that the last wheel of the train or series will make a complete revolution at any desired number of reciprocations of the pump-rod of a windmill or any number of rotations of the wind-wheel thereof, so that the bearings will be lubricated at intervals of the desired length and the lubricant will not be unnecessarily used and wasted, as is the case where the bearings are continuously fed with oil.

The ratchet-wheels of the train or series are locked against retrograde rotation by longitudinally-disposed check pawls or dogs 14, fulcrumed between their ends on a suitable pivot or shaft and provided at one end with a tooth and at the other end with a weight which is adapted to hold the tooth in engagement with the ratchet-wheel. The tooth is beveled to permit the ratchet-wheels to rotate forward; but it is capable of locking them against backward movement, as will be readily apparent.

The oil or other lubricant employed is carried from the lower portion of the casing to a distributing device 15 by an oscillating feeder or carrier 16, provided at opposite sides with arms 17 and 18, terminating in pivots and arranged in suitable bearings $17^a$, located at opposite sides of the casing, as clearly illustrated in Fig. 5 of the accompanying drawings. The arm 18, near its lower or pivoted end, is inwardly offset to provide a shoulder 19, which is arranged normally in the path of the tooth or projection 13 of the last wheel of the train or series, whereby such tooth or projection will engage the arm 18 and swing the carrier or feeder from the position illustrated in Fig. 2 of the accompanying drawings to that shown in Fig. 3 to deliver a quantity of oil to the distributing device 15. The gradual rotation of the last wheel of the series slowly elevates the feeder or carrier and swings the same gradually to a position over the distributing device, and this gradual movement of the train permits the carrier or feeder to remain in such position a sufficient length of time for all of the lubricant contained within it to flow upon the distributing device. After the tooth or projection 13 of the last wheel leaves the arm 18 the carrier or feeder is returned to the position illustrated in Fig. 2 by a spring 20, secured near one end within the casing and having its other end bent laterally and arranged to engage the arm 18.

The oscillating feeder or carrier is provided with a series of longitudinal grooves or gutters 21, which are partially covered at their rear ends to form cups 22, in which the oil collects, and the said keeper or carrier by its oscillation inverts the cups when it reaches a position above the distributing device. The distributing device 15 is provided with a series of grooves or gutters 23, corresponding with those of the feeder or carrier and designed to communicate with separate delivery-tubes 2, and, if desired, the grooves or gutters may be made of different widths to vary the amount of oil fed to the several bearings of a machine and also to enable the bearings requiring a large amount of oil to be supplied with a greater quantity than those requiring only a small amount.

Instead of actuating the train of gearing or ratchet-wheels by a reciprocating pawl or dog any other suitable device, such as a worm, may be provided.

The invention has the following advantages: The lubricator, which is simple and comparatively inexpensive in construction, is designed for windmills and various other machinery, and it is capable of intermittently and at regular intervals supplying the bearings with oil, whereby they are maintained in proper condition. The number of the wheels of the train or series and the teeth thereof may be varied, so that the oil will be fed to a windmill or other machine after the same has performed a given quantity of work. The grooves or gutters of the oscillating carrier or feeder correspond with those of the distributing device, and the oil in the several cups is kept separate and is conveyed to the proper delivery-tube. The gradual movement of the oscillating feeder or carrier enables the same to be held above the distributing device a sufficient length of time for all the oil to drain from the cups and the grooves or gutters.

The distributing device, which may be mounted in any suitable manner, is preferably provided with arms 24, which engage eyes 25 of the casing.

Changes in the form, proportion, size, and the minor details of construction within the scope of the appended claims may be resorted to without departing from the spirit or sacrificing any of the advantages of this invention.

What is claimed is—

1. A lubricator comprising a casing forming an oil-reservoir and provided at one end with means for distributing oil to the bearings of a machine, an oscillating carrier arranged to swing to and from the distributing means, a transversely-disposed series of wheels located within the casing, connections between the wheels whereby they may rotate one another successively, means connected to the rear wheel of the series for operating the carrier, and actuating means located at the other end of the series for rotating the first wheel and designed to be connected with the machine to be lubricated, substantially as described.

2. A lubricator comprising a casing forming an oil-reservoir and provided with means for distributing oil to the bearings of a machine, a transverse series of wheels located within the casing, connections between the wheels whereby they may rotate one another successively, an oscillating carrier arranged to swing over the gearing to the distributing means, means connected to the rear wheel of the series for operating the carrier, and an actuating-pawl arranged to engage the first wheel of the series and designed to be connected to the machine to be lubricated, substantially as described.

3. A lubricator comprising a casing and provided with a distributing device having separate compartments or gutters, a transversely-disposed series of wheels arranged within the lubricator, connections between them whereby they may rotate one another successively, an oscillating carrier arranged to swing over the said wheels, said carrier being provided with longitudinal grooves or gutters having cups at their rear ends and corresponding with the compartments or gutters of the distributing device, means connected to the wheel at one end of the series for operating the carrier, and means for actuating the wheel at the other end of the series, substantially as described.

4. A lubricator comprising a casing provided with a distributing device having separate grooves or gutters, a transversely-disposed series of wheels located within the casing, connections between the wheels whereby they may rotate one another successively, a rectangular carrier arranged to swing over the gearing, said carrier being provided with partially-covered longitudinal grooves, means connected to the wheel at one end of the series for operating the carrier, and means for actuating the wheel at the other end of the series, substantially as described.

5. A lubricator comprising a casing provided with distributing means, a transversely-disposed series of wheels located within the casing, connections between them whereby they may rotate one another successively, an oscillating carrier arranged to swing over the gearing and provided at opposite sides of the casing with arms journaled thereon, means connected to the last wheel of the series for engaging the adjacent arm of the carrier for operating the latter, and a pawl for actuating the first wheel of the series, substantially as described.

6. A lubricator comprising a casing provided with a distributing device, a transversely-disposed series of wheels located within the casing, connections between them whereby they may rotate one another successively, an oscillating carrier arranged to swing over the said wheels, means connected to the last wheel for operating the carrier, a reciprocating pawl arranged to actuate the first wheel, a rock-shaft having a crank connected with the reciprocating pawl, and means for connecting the rock-shaft with the machine to be lubricated, substantially as described.

7. A lubricator comprising a casing, a train of ratchet-wheels located within the casing and provided with teeth or projections to engage the adjacent wheels, whereby the same may be successively rotated, an oscillating carrier arranged to swing over the said wheels, means carried by the last wheel of the series for operating the carrier to move the same to the distributing device, the weighted check pawls or dogs engaging the ratchet-wheels and locking the same against retrograde movement, and means for rotating the first wheel of the train, substantially as described.

8. A lubricator comprising a casing, a distributing device, the transversely-disposed train of ratchet-wheels located within the casing, connections between the wheels whereby they may rotate one another successively, an oscillating carrier arranged to swing over the gearing, means connected to the last wheel for operating the carrier, the reversely-arranged weighted check-pawls engaging the ratchet-wheels, a centrally-arranged pivot supporting said pawls, and a reciprocating pawl for rotating the first wheel, substantially as described.

9. A lubricator comprising a casing, a transversely-disposed series of wheels located within the casing, connections between the wheels, whereby they may rotate one another successively, an oscillating carrier arranged to swing over the said wheels, a distributing device located at one side of the series of wheels, means connected to the last wheel of the series for operating the carrier to move the same to the distributing device, a spring for swinging the carrier in the opposite direction, a reciprocating pawl engaging and rotating the first wheel, a rock-shaft having a crank connected with the reciprocating pawl, and a lever mounted on the rock-shaft and located outside of the casing and designed to be connected with the machine to be lubricated, substantially as described.

In testimony that I claim the foregoing as my own I have hereto affixed my signature in the presence of two witnesses.

HERMAN TENHAM.

Witnesses:
 GEO. E. FORWARD,
 O. G. ROBBINS.